United States Patent [19]

Burnier

[11] 4,211,087

[45] Jul. 8, 1980

[54] DEVICE FOR MAINTAINING A VACUUM IN A COMPARTMENT OF A ROTATING MEMBER

[75] Inventor: Pierre H. Burnier, Longjumeau, France

[73] Assignee: BBC Brown Boveri & Cie., Baden, Switzerland

[21] Appl. No.: 882,093

[22] Filed: Mar. 1, 1978

[30] Foreign Application Priority Data

Mar. 3, 1977 [FR] France .................................. 77 06188

[51] Int. Cl.² .............................................. F17C 7/02
[52] U.S. Cl. ...................................... 62/55.5; 62/268; 62/514 R
[58] Field of Search ............ 62/100, 268, 55.5, 514 R; 55/269, DIG. 15

[56] References Cited

U.S. PATENT DOCUMENTS

| 3,823,569 | 7/1974 | Sellmaier et al. | 62/55 |
| 4,117,694 | 10/1978 | Belmore | 62/55.5 |

Primary Examiner—Ronald C. Capossela
Attorney, Agent, or Firm—Burns, Doane, Swekcer & Mathis

[57] ABSTRACT

A device for maintaining a vacuum in a compartment of a rotating member includes a collector which is mounted over an orifice of the rotating member. The collector has an end wall with an annular aperture extending axially of the rotating member. The aperture is selectively sealed by an annular valve member which permits communication of the compartment with a high-vacuum pump. The valve member may be of a magnetizable material and may be moved axially by a fixed control coil. Sealing members are provided for sealing the compartment of the rotating member with respect to a fixed member when the compartment is in communication with the vacuum pump.

11 Claims, 1 Drawing Figure

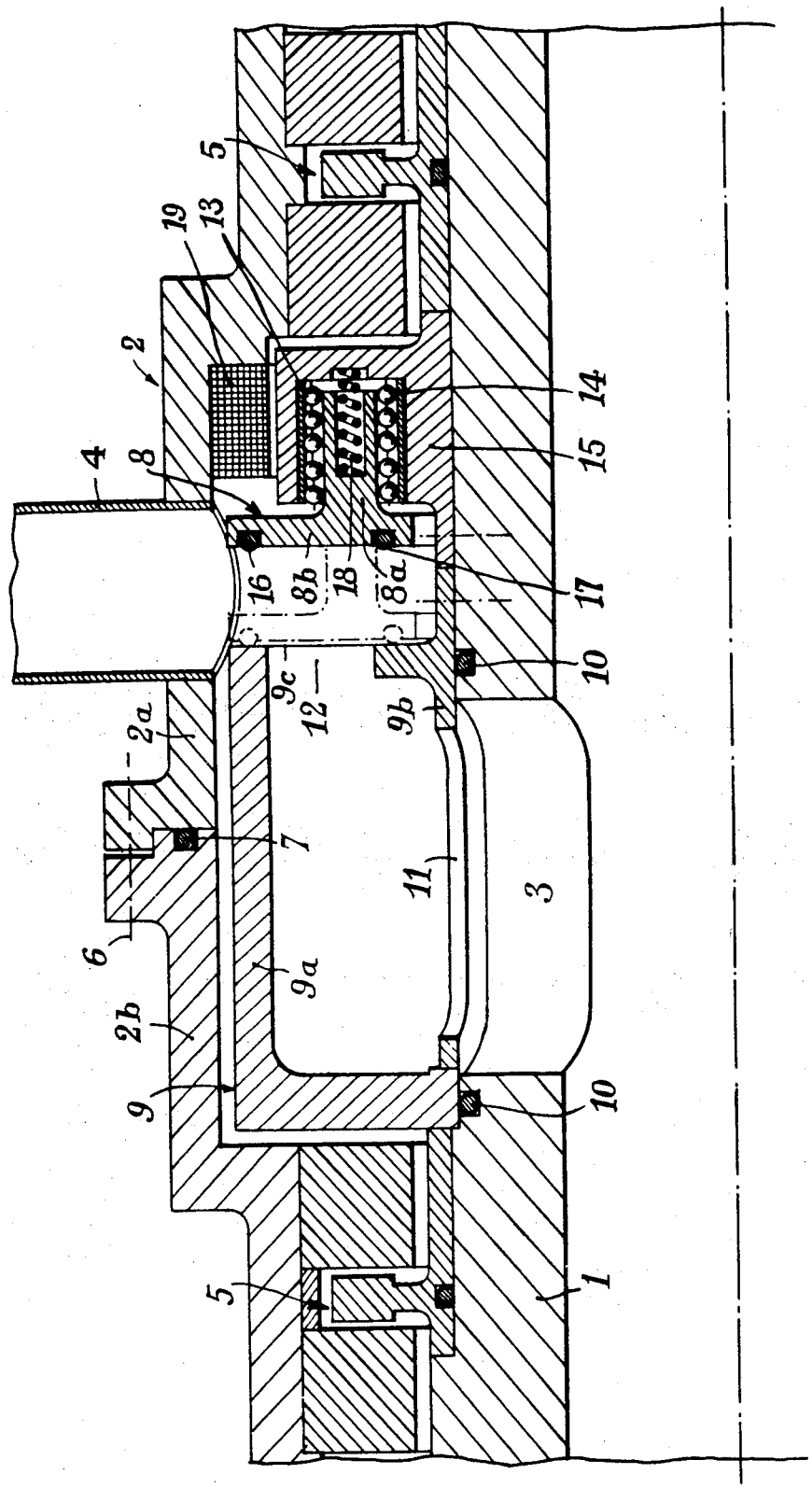

DEVICE FOR MAINTAINING A VACUUM IN A COMPARTMENT OF A ROTATING MEMBER

BACKGROUND AND SUMMARY OF THE PRESENT INVENTION

The present invention relates generally to a method and apparatus for maintaining a vacuum in a rotating member and more particularly relates to a method and apparatus for maintaining a vacuum in a rotating cryostat with a fixed vacuum pump which is operated intermittently.

Typically, a very high degree of reliability is demanded of a turbo-alternator. The same high degree of reliability is generally demanded of a turbo-alternator having superconducting windings. In particular, it is necessary that a vacuum be maintained in a double-walled casing of a cryostat of the turbo-alternator containing a rotor winding over a long period of time. In order to maintain the vacuum, a secondary vacuum pump which requires regular maintenance is typically mounted on board the rotor. The secondary vacuum pump may be utilized to pump the compartment empty when the machine is stopped with the compartment being sealed while the machine is rotating. Alternatively, the secondary vacuum pump has been utilized to effect a continuous pumping of the rotating cryostat from the outside.

Pumping the compartment empty when the machine is stopped is currently being tested in the case of helium reservoirs. In some cases, a sealed compartment does not need to be repumped for several years. In the case of a turbo-alternator, however, the walls of the vacuum compartment are subjected to relatively more severe stresses (centrifugal force, vibrations) and the possibility of cracks in these walls are to be feared. In the case of a turbo-alternator, if the loss of vacuum does not consist of an escape of helium, a gas entering the compartment will condense on the walls of the compartment, since the internal wall of the vacuum compartment is at a very low temperature (cryopumping). On the other hand, if the leakage consists of a loss of helium, the vacuum will be irrevocable broken.

To guard against the loss of vacuum, continuous pumping is sometimes utilized. But continuous pumping is not without danger. In continuous pumping, the vacuum compartment includes a rotating portion, a fixed portion which is connected to the vacuum pump and two rotating seals for connecting the rotating and fixed portions together. A single seal would otherwise be necessary at the end of the machine but that region is already occupied by a helium transfer device. Where a high vacuum is desired, the section to be provided with the vacuum should have a sufficient size. Accordingly, the seals or the systems of seals should have a corresponding large diameter with the peripheral speed of the seals being high. The possibility of a fracture in the sealing at the level of the rotating seals is to be avoided since in the case of continuous pumping the remedy would be almost worse than the ill.

Accordingly, it is an object of the present invention to provide a method and apparatus for maintaining a vacuum in a rotating member using a vacuum pump.

Another object of the present invention is to provide a method and apparatus for maintaining a vacuum in a rotating cryostat using a vacuum pump which is operated intermittently.

Still another object of the present invention is to provide a method and an apparatus for maintaining a vacuum in a rotating cryostat which overcomes the disadvantages of the known methods and devices.

A device according to the present invention enables the vacuum compartment of a rotating cryostat to be connected to a fixed high-vacuum pump and to be responsible for maintaining the vacuum in the compartment. The device includes a fixed portion which is connected to the vacuum pump and a rotating portion that is concentric with the fixed portion. The rotating portion is equipped with a pumping orifice and at least one rotating seal disposed between the fixed portion and the rotating portion. The rotating portion includes at least one valve which rotates with the rotating portion and which closes the pumping orifice of the rotating portion when the vacuum is correct. Means are provided for enabling the valve to be separated from the pumping orifice to bring the vacuum compartment into communication with the pump when the vacuum in the compartment becomes inadequate.

BRIEF DESCRIPTION OF THE DRAWING

In order that the invention may be more readily understood, reference is made to the single FIGURE of the accompanying drawing which is a semi-axial sectional view of a device according to the present invention.

DETAILED DESCRIPTION OF THE PREFERRED EMBODIMENT

With reference to the single figure, a device according to the present invention includes, in a known manner, a rotating portion 1 inside of which is maintained a high vacuum. The rotating portion 1 may, for example, be the shaft of a rotating electrical machine, such as a turbo-alternator having a super-conducting rotor winding. A fixed portion 2, which surrounds the rotating portion 1 concentrically, may include a shaft housing. The rotating portion 1 is provided with a pumping orifice 3. Similarly, the fixed portion 2 is connected to a conventional high-vacuum pump (not illustrated) by a connecting pipe 4. A pair of conventional rotating seals 5 provide a sealing between the rotating portion 1 and the fixed portion 2. The fixed portion 2 may, for example, consist of two substantially cylindrical portions 2a and 2b which are assembled together end to end by screws through flange portions of the portions 2a and 2b as indicated at 6. A toroidal seal 7 may be provided in a junction plane of the portions 2a and 2b.

A valve 8 rotates with the rotating portion 1 and, in normal times, prevents a communication between the vacuum pump (not illustrated) and the vacuum compartment formed inside the rotating portion 1. The valve 8 may be adapted to directly obstruct the pumping orifice 3. However, since the orifice 3 generally has a relatively large dimension in the axial direction of the rotating portion 1, such an arrangement would necessitate being able to displace the valve 8 axially over a relatively great distance in order to release the pumping orifice 3 completely. Accordingly, in a preferred embodiment of the present invention, a cylindrical annular collector 9 is provided between the rotating portion 1 and the fixed portion 2. The collector 9 is mounted on the rotating portion 1 in such a manner as to be able to rotate with the portion 1. Sealing is provided between the collector 9 and the rotating portion 1 by two toroidal seals 10 which are disposed at each side of the pumping orifice 3. To facilitate construction, the collector 9 preferably includes two parts 9a and 9b. The part 9b which forms the internal cylindrical wall of the collector 9 has an aperture 11 that is situated adjacent to the pumping orifice 3. An annular aperture 12 is formed between the parts 9a and 9b of the collector 9 and is arranged at one end of the collector.

The valve 8 has an annular shape and is mounted for axial movement with respect to the rotating portion 1. The valve 8 includes a cylindrical portion 8a which can slide axially between two rows of balls 13 and 14 in a cavity of a block 15. The block 15 is spaced axially from the collector 9 and is connected to the rotating portion 1 for rotation. The valve 8 also includes a radial portion 8b in the form of a ring having two concentric toroidal seals 16, 17 which are provided in a face of the radial portion 8b and are directed towards the collector 9. The seals 16, 17 can be applied against an end wall 9c of the collector 9 from both sides of the aperture 12 to block the aperture. The valve 8 is urged into a closed position (illustrated in phantom in the drawing) by means of a spring 18 which is housed partially in the cylindrical portion 8a of the valve 8. The spring 18 bears against an annular stop forming bottom of a cavity in the block 15.

In order to permit the valve 8 to be opened when desired, the valve is made of magnetizable material and a fixed control coil 19 is carried by the fixed portion 2. When the coil 19 is energized by an electronic control circuit (not shown), the coil produces a magnetic field which acts against the action of the spring or springs 18 to remove the valve 8 from the end wall 9c of the collector 9. In this way, the aperture 12 is exposed and the pumping orifice 3 is brought into communication with the pipe 4.

The control coil could, of course, be mounted on the rotating portion 1 instead of on the fixed portion 2.

The two rotating seals 5 are preferably engageable type rotating seals and are well known. These seals are normally urged into an inactive position by a spring and can be brought into an active position for example, under the control of an electro-magnet or by hydraulic or pneumatic action.

During operation of the device according to the present invention, it is assumed that the vacuum compartment is sealed by the valve 8. If, in the course of operation, a vacuum gauge indicates a reduction in the vacuum in the compartment, the seals 5 are engaged and the vacuum pump is started. When the vacuum existing on either side of the valve 8 is comparable, the valve is opened by energizing the coil 19, and at this time the pumping begins. When the vacuum in the compartment has reached a sufficient value, the coil 19 is de-energized and the valve 8 is closed again by the spring 18. The seals 5 are now disengaged and the pump is stopped.

So long as the vacuum is correct, sealing is provided by the fixed seals 16 and 17 of the valve 8. Accordingly, the life of the rotating seals is increased.

As can be seen from the above, the solution provided by the invention therefore combines the advantages of the two extreme solutions known while avoiding their disadvantages.

If desired, the engageable rotating seals 5 may be replaced by long-life rotating seals that work continuously as in the devices already known. In this way, the reliability of the system is further increased because sealing is provided by both the valve and the rotating seals, so long as the vacuum is correct.

Furthermore, if desired, one or more circular apertures may be provided in the end wall 9c of the collector 9, instead of providing one annular aperture 12. A valve may be associated with each of the apertures and all of the valves, if they are in a plurality, may be connected together so as to be actuated simultaneously.

It is understood that the form of embodiment of the invention which has been described above has been given by way of a purely indicative and in no way limiting example and that other modifications may easily be made by one skilled in the art without therefore departing from the scope of the invention.

What is claimed is:

1. A device for maintaining a vacuum in a compartment of a rotating cryostat with a fixed source of vacuum, comprising:
   a rotating member of the rotating cryostat having a compartment and an orifice in communication with the compartment;
   a fixed member, concentric with the rotating member and connected to the fixed source of vacuum;
   valve means for releasably providing communication between the orifice and the fixed source of vacuum through the fixed member; and
   collector means for providing an axially extending aperture in communication with the orifice of the rotating member, the valve means releasably closing the aperture of the collector means to prevent communication between the orifice of the rotating member and the fixed source of vacuum.

2. The device of claim 1, wherein the valve means rotates with the rotating member.

3. The device of claim 1 further comprising:
   control means for operating the valve means to provide communication when the vacuum within the compartment is inadequate and to prevent communication when the vacuum is adequate.

4. The device of claim 1, wherein the collector means includes a cylindrical annular collector provided between the fixed member and the rotating member, the collector being sealed to the rotating member and mounted for rotation with the rotating member and having
   an internal cylindrical wall,
   a radially extending aperture adjacent the orifice of the rotating member and provided in the internal cylindrical wall,
   an annular end wall, the axially extending aperture being annular and provided in the end wall.

5. The device of claim 4 wherein the
   valve means includes an annular member which is mounted for axial movement relative to the rotating member and for rotation with the rotating member, the annular member having a ring-shaped portion with two concentric, toroidal seals mounted in a face of the ring-shaped portion for engagement with the annular end wall of the collector on either side of the axially extending aperture.

6. The device of claim 5 wherein the valve means further includes
   spring means for axially urging the annular member of the valve means against the end wall of the collector, the spring means bearing against an axial stop which is rigidly connected to the rotating member.

7. The device of claim 6 wherein the annular member of the valve means is of a magnetizable material, the valve means further comprising
a fixed control coil means for selectively providing a magnetic field to move the annular member of the valve means away from the end wall of the collector, the fixed control coil means being carried by the fixed member.

8. A device for maintaining a vacuum in a compartment of a rotating cryostat with a fixed source of vacuum provided by a high-vacuum pump, comprising:
a rotating member having a compartment and an orifice in communication with the compartment;
a fixed member concentric with the rotating member and connected to the fixed source of vacuum;
a collector provided between the rotating member and the fixed member and sealed to the rotating member for rotation, the collector being mounted for rotation with the rotating member and having
an internal cylindrical wall having a radially extending aperture adjacent the orifice of the rotating member, and
an annular end wall having an annular, axially extending aperture provided in the end wall;
an annular valve member of magnetizable material mounted for axial movement and for rotation with the rotating member, the annular member having a ring-shaped portion with two concentric, toroidal seals mounted in a face of the ring-shaped portion for engagement with the annular end wall on either side of the axially extending aperture;
a spring for axially urging the annular member against the end wall, the spring bearing against an axial stop which is rigidly connected to the rotating member;
a control coil for selectively providing a magnetic field to move the annular member away from the end wall of the collector; and
sealing means for sealing the compartment with respect to the fixed member at least whenever the annular member is away from the end wall of the collector.

9. A method of maintaining a vacuum in a compartment of a cryostat having a rotating member, comprising the steps of:
sealing a compartment of the rotating member by urging an annular member which is rotating with the rotating member against an annular end wall that is rotating with the rotating member, the annular end wall having an aperture in communication with the compartment;
communicating the compartment with a fixed source of vacuum by urging the annular member away from the end wall whenever the vacuum within the compartment is inadequate;
simultaneously sealing the compartment with respect to the fixed member on either side of the communication between the fixed source of vacuum and the compartment; and
again sealing the compartment of the rotating member by urging the annular member against the end wall whenever the vacuum in the compartment is adquate.

10. The method of claim 9, wherein the annular member is spring-biased and is moved axially with respect to the annular end wall to provide communication and to seal the compartment.

11. The method of claim 10, wherein the spring-biased annular member is moved axially by applying a magnetic field to the annular member whenever the vacuum within the compartment is inadequate.

* * * * *